United States Patent [19]

Woerner et al.

[11] Patent Number: 4,530,940

[45] Date of Patent: Jul. 23, 1985

[54] STABILIZED MELAMINE RESIN FOAMS

[75] Inventors: Frank P. Woerner, Wachenheim; Horst Reimann, Worms; Harald Mahnke, Ludwigshafen; Peter Neumann, Wiesloch; Gerhard Turznik, Ludwigshafen; Hanshelmut Käeppel, Weinheim, all of Fed. Rep. of Germany

[73] Assignee: BASF Aktiengesellschaft, Fed. Rep. of Germany

[21] Appl. No.: 625,690

[22] Filed: Jun. 28, 1984

[30] Foreign Application Priority Data

Jul. 2, 1983 [DE] Fed. Rep. of Germany ....... 3323943

[51] Int. Cl.$^3$ ................................................ C08J 9/30

[52] U.S. Cl. ...................... 521/124; 521/92; 521/93; 521/125; 521/187; 521/188; 524/357; 524/413; 524/423; 524/435

[58] Field of Search .............. 521/187, 188, 124, 92, 521/93, 125; 524/413, 423, 504 FE, 357, 435

[56] References Cited

U.S. PATENT DOCUMENTS 4,208,485 6/1980 Nahta ................................... 521/187

Primary Examiner—Morton Foelak
Attorney, Agent, or Firm—Keil & Weinkauf

[57] ABSTRACT

Stabilized melamine resin foams contain, as a stabilizer, a copper or iron compound in an amount corresponding to from 10 ppm to 3%, based on the weight of the melamine resin, of Cu or Fe, preferably an oxide, hydroxide or carbonate of copper.

4 Claims, No Drawings

STABILIZED MELAMINE RESIN FOAMS

Foams based on melamine/formaldehyde condensates have long been known. Very recently, a process for the preparation of resilient melamine resin foams has been developed (EP-B 17 671), in which aqueous dispersions which contain a melamine/formaldehyde precondensate, an emulsifier, a volatile blowing agent and a curing agent are foamed and cured. The resulting foams are very resilient and also have an advantageous fire behavior and good thermal stability. They are open-cell, ie. they contain virtually no cell membranes but consist only of cell webs. The length/thickness ratio of these webs is greater than 10:1, preferably greater than 15:1, and the density of the webs is greater than 1.10, preferably greater than 1.30, g.cm$^{-3}$.

We have found that melamine resin foams tend to yellow and become brittle when stored for a long time at elevated temperatures (from 150° to 250° C.) or when exposed to light.

It is an object of the present invention to stabilize melamine resin foams to damage by elevated temperatures and the effect of light.

We have found that this object is achieved, and that copper or iron compounds in amounts corresponding to from 10 ppm to 3%, preferably from 100 ppm to 1%, of Cu or Fe, the percentages being based on the weight of the melamine resin, have an advantageous stabilizing effect. They display their action in all conventional melamine resin foams, but are particularly effective in resilient foams which are prepared in accordance with the cited EP-B 17 671, where an aqueous dispersion which contains a melamine/formaldehyde precondensate, an emulsifier, a blowing agent and a curing agent is foamed and then cured. In an advantageous procedure, highly concentrated solutions, preferably greater than 70% strength by weight, are employed, and foaming is carried out so that the viscosity first increases only slightly, and the curing process, accompanied by a pronounced increase in the viscosity, is begun only when the foaming process is substantially complete.

Particularly suitable stabilizers are the oxides, hydroxides and carbonates of copper, for example $Cu_2O$, CuO and $Cu(OH)_2$ and a finely divided CuO on $Al_2O_3$. Basic carbonates, such as $CuCO_3.Cu(OH)_2$ and $2CuCO_3.Cu(OH)_2$, are particularly preferred. Other inorganic copper compounds, eg. $Cu_3(PO_4)_2$, $CuSO_4$, CuBr, $CuBr_2$, CuCl, $CuCl_2$, $Cu(NO_3)_2$ CuI, CuI.KI and $Cu(SCN)_2$, are also suitable.

Another preferred class of stabilizers are copper salts of monobasic and polybasic carboxylic acids, aromatic sulfonic acids and organic phosphoric acids. The specific examples are copper formate, acetate, propionate, laurate, stearate, naphthenate, oxalate, citrate, benzenesulfonate, phenolsulfonate and salicylate. Other suitable compounds are the neutral and ionic complexes of divalent copper, suitable ligands including amines, such as 2,2-dipyridyl, aldehydes, such as salicylaldehyde, β-diketones such as acetylacetone, aminocarboxylic acids, such as glycine, ethylenediaminetetraacetic acid and nitrilotriacetic acid, aminophenols, such as 8-hydroxyquinoline, 1,2-dioximes, such as dimethylglyoxime, and biuret, thiosemicarbazide, phthalocyanines and azo dyes. Water-soluble complexes are preferred.

Apart from copper compounds, iron compounds, eg. $FeSO_4$, $FeCl_2$, $FeCl_3$, $(NH_4)Fe(SO_4)_2$, $Fe(NO_3)_2$, iron formate, basic iron(III) acetate and iron(II) oxalate, have also proven effective.

The novel stabilizers can be mixed with the starting materials during the preparation of the foams, soluble copper compounds advantageously being added together with the aqueous emulsifier/curing agent solution. It is advantageous to use conventional antioxidants, UV adsorbers and light stabilizers in addition.

In the Example, percentages are by weight.

EXAMPLE

In an open vessel, a spray dried melamine/formaldehyde precondensate (molar ratio 1:3, molecular weight about 400) was added to an aqueous solution containing 3% of formic acid and 1.5% of the sodium salt of a mixture of alkylsulfonates where alkyl is of 12 to 18 carbon atoms (emulsifier K 30 from Bayer AG), the percentages being based on the melamine resin. The concentration of the resin was 74.0%, based on the mixture of resin and water. The mixture was stirred vigorously, after which 20% of pentane was added. Stirring was continued until a homogeneous dispersion formed (about 3 minutes). This was applied, by means of a knife-coater, onto a teflon-coated glass fabric as the base and was then foamed and cured in a drying oven at an air temperature of 150° C. The temperature of the foam corresponded to the boiling point of the pentane, which was 37.0° C. under these conditions. After 4½ minutes, the foam had achieved 80% of its maximum expansion, the latter being reached after 7-8 minutes. The foam was left in the drying oven for a further 10 minutes at 150° C.

Various stabilizers were added to the starting materials. The foams were heated for 24 hours at 240° C., after which the degree of yellowing and the embrittlement were measured. The results are shown in the Table.

| Stabilizer | Amount of Cu or Fe in % | Yellowing | Embrittlement |
| --- | --- | --- | --- |
| — | — | Pronounced | Pronounced |
| $CuCO_3.Cu(OH)_3$ | 0.08 | Minimal | Minimal |
| $Cu(OH)_2$ | 0.08 | Minimal | Minimal |
| " | 0.04 | " | " |
| " | 0.02 | Slight | Slight |
| $Cu_2O$ | 0.08 | Minimal | Minimal |
| $Cu_2O$ | 0.02 | " | " |
| $Cu(ac)_2$ | 0.08 | " | " |
| CuO | 0.08 | " | " |
| CuO (40% strength on $Al_2O_3$) | 0.08 | " | " |
| $CuSO_4$ | 0.08 | Slight | Slight |
| $CuCl_2.2H_2O$ | 0.08 | Minimal | Minimal |
| $Cu(NO_3)_2.3H_2O$ | 0.08 | " | " |
| $CuBr_2$ | 0.08 | Slight | Slight |
| $Cu(acetylacetonate)_2$ | 0.1 | " | " |
| $FeSO_4.7H_2O$ | 0.08 | Slight | Slight |
| $FeCl_2.4H_2O$ | 0.08 | " | " |
| $Fe_2(SO_3)_3.xH_2O$ | 0.08 | " | " |
| $FeCl_3$ | 0.08 | " | " |
| $Fe(ac)_2OH$ | 0.08 | " | " |
| Fe(III)—oxalate | 0.08 | " | " |

We claim:
1. A stabilized melamine/formaldehyde resin foam which contains, as a stabilizer, a copper or iron compound selected from the group consisting of a copper oxide, hydroxide or carbonate, $Cu_3(PO_4)_2$, $CuSO_4$, CuBr, $CuBr_2$, CuCl, $CuCl_2$, $Cu(NO_3)_2$, CuI, CuI.KI, $Cu(SCN)_2$, a copper salt of a monobasic or polybasic carboxylic acid, aromatic sulfonic acid or organic phos- phoric acid, a neutral or ionic complex of divalent copper, $FeSO_4$, $FeCl_2$, $FeCl_3$, $(NH_4)Fe(SO_4)_2$, $Fe(NO_3)_2$, iron formate, basic iron(III) acetate and iron(II) oxalate in an amount corresponding to from 10 ppm to 3%, based on the weight of the melamine/formaldehyde resin, of Cu or Fe.

2. A melamine/formaldehyde resin foam as claimed in claim 1, which contains a copper oxide, hydroxide or carbonate as a stabilizer.

3. A melamine/formaldehyde resin foam as claimed in claim 1, which contains basic copper carbonate $CuCO_3.Cu(OH)_2$ or $2CuCO_3.Cu(OH)_2$.

4. A melamine/formaldehyde resin foam as claimed in claim 1, which contains a water-soluble copper complex as a stabilizer.

* * * * *